United States Patent [19]

Han

[11] Patent Number: 5,768,324
[45] Date of Patent: Jun. 16, 1998

[54] BURST DATA TRANSMITTER USING A SYNC SIGNAL OF DISTRICT CENTER AND A METHOD THEREFOR

[75] Inventor: Byung Eun Han, Seoul, Rep. of Korea

[73] Assignee: Hyundai Electronics Industries Co. Ltd., Rep. of Korea

[21] Appl. No.: 526,880

[22] Filed: Sep. 12, 1995

[30] Foreign Application Priority Data

Dec. 31, 1994 [KR] Rep. of Korea .................. 1994-40408

[51] Int. Cl.$^6$ .................................................. H04L 7/00
[52] U.S. Cl. ........................ 375/356; 375/354; 370/347; 370/350; 370/514
[58] Field of Search ........................ 375/354, 356, 375/365, 364; 370/321–322, 337, 347–348, 442–443, 498, 514, 350

[56] References Cited

U.S. PATENT DOCUMENTS 5,303,234 4/1994 Kou ........................................ 370/442
5,613,195 3/1997 Ooi ........................................ 375/356

FOREIGN PATENT DOCUMENTS 58-88938 5/1983 Japan .

*Primary Examiner*—Temesghen Ghebretinsae
*Attorney, Agent, or Firm*—Fish & Richardson, P.C.

[57] ABSTRACT

A burst data transmitter by using an FIT sync signal transmitted from a district center to allow plural end offices to transmit burst data to the district center by means of an assigned slot using the FIT signal as a reference is applied to all end offices that transmit the slot assigned from the district center during the data transmission by a satellite, and a method therefor constructs the centrally-controlled Star system which decreases the frequency of error occurrence and shortens a recovery time in case of occurring the error by reinforcing a simple data transmission function of various communication systems for transmitting/receiving data by a satellite such as the VSAT system being a sub-miniature end earth station system that spends too much error-recovery time once an error occurs during the data transmission/reception. Thus, the sync signal in the data transmitted from the district center to the end office is simply extracted to be utilized to transmit the data, so that a separate sync channel is not required to thereby obtain an economical effect.

12 Claims, 2 Drawing Sheets

BURST DATA TRANSMITTER USING A SYNC SIGNAL OF DISTRICT CENTER AND A METHOD THEREFOR

BACKGROUND OF THE INVENTION

1. Field of the Invention

The present invention relates to a burst data transmitting apparatus using a sync signal of a district center and method therefor, and more particularly to a burst data transmitter for using a frame/identification/timing (hereinafter simply referred to as "FIT") signal transmitted from a district center to allow a plurality of end offices to transmit burst data to the district center by means of an assigned slot using the FIT signal as a reference, which is applied to all end offices that transmit the slot assigned from the district center during the data transmission by means of a satellite.

2. Description of the Prior Art

Generally various systems such as the VSAT system which is a sub-miniature end earth station system are a communication system for transmitting/receiving data by means of a satellite, but these systems spend too much error-recovery time once an error occurs during the transmission/reception of data and have a simple function of data transmission.

Accordingly, a problem of establishing synchronization during the mutual transmission/reception comes to the forefront in a communication system.

In connection with this, Japanese Patent Publication Laid-open No. sho 58-88938 discloses a technique relating to an apparatus and method for establishing accurate timing synchronization when transmission/reception is carried out between a district center (control station) and end office (data transmission station) in a communication system using a satellite. In this satellite packet communication system for exchanging data intermittently produced between corresponding earth stations via a stationary satellite, when a reference timing of overall communication system is set via a high stability oscillator, a transmission/reception timing circuit and a transmitter/receiver, the reference timing is transmitted to a plurality of data transmission stations which then transmit a subscription signal after being synchronized with the timing.

The control station supplied with the subscription signal makes out to transmit timing information which represents the position of an empty time slot and an address signal of the data transmission station which has received the subscription to the data transmission station again. In turn, the data transmission station supplied with the timing information permits an information data packet to be transmitted to other stations and the control station to sync with the timing for transmitting the result to the empty time slot position, thereby solving the concern of synchronization which causes a problem in a slot aloha satellite packet communication system, and reducing the scale of the data transmission station. As the result, an economical communication system can be constructed.

Thus, the above technique aims to establish synchronization and construct an economical communication system by a simple synchronization system. Whereas, in the present invention, an FIT signal which is a sync signal transmitted together with data from a district station is analyzed in an end office to extract a carrier ID and time slot number. Then, if there is information data to be transmitted at this time, burst data (information data) is transmitted to an assigned time slot, so that a separate sync channel is not utilized to establish communication synchronization by means of the FIT signal as well as construct an economical communication network. Therefore, both techniques are similar to each other on directing simple synchronization establishment and construction of an economical communication network. However, means and a method for embodying the object of them differ from each other, which cannot be mutually applied.

SUMMARY OF THE INVENTION

The present invention is devised to reinforce the above-described function. Accordingly, it is an object of the present invention to provide a burst data transmitter for transmitting data to a slot assigned by a district center by constructing the Star system which is a central control system capable of decreasing the frequency of error occurrence and shortening a recovery time in case of occurring the error.

To achieve the above object of the present invention, there is provided an apparatus for transmitting burst data from an end office to a district center includes an FIT detector for receiving to analyze an FIT signal transmitted from the district center, and a burst processor for receiving to decode the data analyzed by the FIT detector and storing a time slot number from a controlling portion which controls overall system of the end office in accordance with the input of a carrier ID signal decoded by the burst processor. A carrier ID switch is used for setting a carrier ID of the end office to both the district center and end office during the system construction of the district center and end office, and a preamble pattern generating portion generates a preamble pattern for allowing for the data transmission upon the receipt of the time slot number to be transmitted. Also, a user computer supplies pure data to be transmitted to the district center, and simultaneously outputs a transmission request signal. Furthermore, a data interface equipment interfaces the user computer and end office, and a data transmitting portion encodes the pure data output via the data interface equipment and outputs the encoded data in accordance with the input of a transmission-ready completion signal from the burst processor. Additionally, an OR gate outputs the preamble data and user pure data from the data transmitting portion and preamble pattern generating portion.

Also, there is provided a method for transmitting burst data from an end office to a district center including the steps of receiving to extract an FIT signal being a sync signal transmitted along with data from the district center to the end office, analyzing the FIT signal to obtain a carrier ID and a time slot number, and transmitting burst data to the assigned time slot, by which the burst data is transmitted by means of the FIT signal without using a separate sync channel.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

In the Star system which is a central control system, a district center supplies a sync signal to a plurality of end offices which then transmits burst data using the sync signal as a reference during the transmission/reception of data by means of a satellite.

Here, the burst data denotes data which is not transmitted under a regular rule, but is transmitted by means of a time slot assigned by the district center when a certain end office intends to transmit it of itself.

The burst data transmitted from the end office consists of preamble data for allowing clocks and carriers to be restored by receiving the burst data in a demodulator of the district center and pure data.

The FIT signal transmitted from the district center is formed such that the "F" signal consisting of 9 bits (011111111) is a sync signal during the data transmission; "I" signal is a carrier ID signal of the end office, i.e., it represents the inherent number of the end office, which is set in advance between the district center and end office by means of a dual in-line package (DIP) switch; and "T" signal consisting of 9 bits designates a time slot number assigned by the district center when the end office transmits the burst data to the district center. The FIT data formed as above becomes one slot by 27 bits in total.

Figure 1:
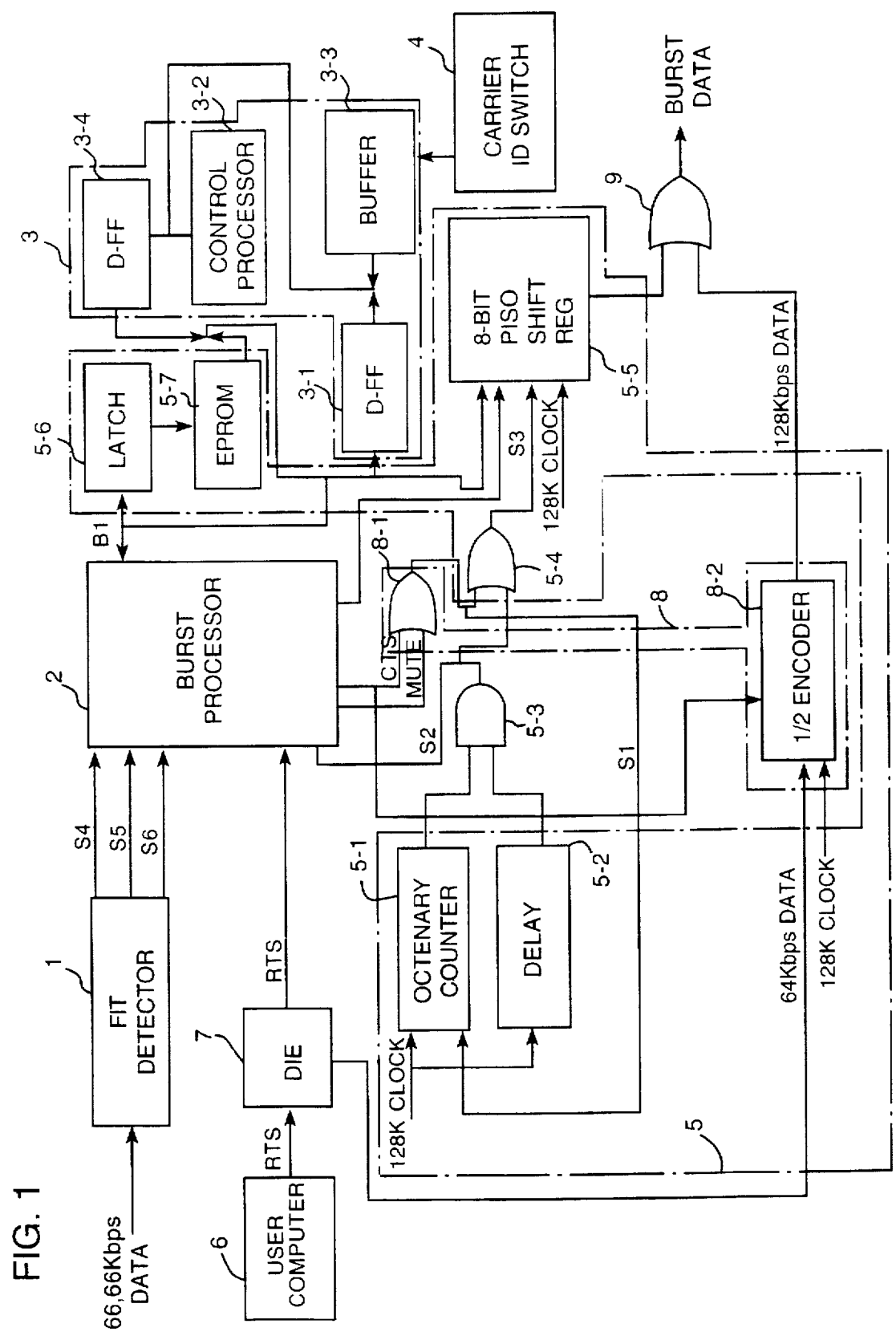
FIG. 1 is a block diagram showing a burst data transmitter according to the present invention.

As shown in FIG. 1, the end office that transmits data to an assigned time slot by receiving the FIT signal formed as above has an FIT detector 1 for receiving to analyze an FIT signal transmitted from a district center, and a burst processor 2 for decoding the analyzed data input from the FIT detector 1 and storing a time slot number from a controlling portion 3 which controls overall system of the end office in accordance with the input of a carrier ID signal decoded by the burst processor 2. In addition, a carrier ID switch 4 is used for setting the carrier ID of the end office to both the district center and end office during the system construction of the district center and end office. A preamble pattern generator 5 produces a preamble pattern for enabling the data transmission upon the receipt of the time slot number to be transmitted, a user computer 6 supplies pure data to be transmitted to the district center while outputting a transmission request signal RTS. A data interface equipment (DIE) 7 interfaces the user computer 6 and the end office, and a data transmitter 8 encodes the pure data output via the DIE 7, and outputs the encoded data in accordance with the input of a transmission-ready completion signal CTS from the burst processor 2. Also, an OR gate 9 supplies the preamble data and user pure data from the data transmitter 8 and preamble pattern generator 5.

The controlling portion 3 includes a first D flip-flop (D-FF) 3-1 for storing the carrier ID from the burst processor 2, and a control processor 3-2 for comparing the carrier ID signal from the first D flip-flop 3-1 with the ID of the end office stored in the carrier ID switch 4 to regard the result as its own ID when they are the same, thereby outputting the time slot number assigned from the district center among a plurality of time slots. Also, a buffer 3-3 temporarily stores the carrier ID from the control processor 3-2, and a second D flip-flop (D-FF) 3-4 receives the time slot number from the control processor 3-2 to output it to the burst processor 2.

The preamble pattern generator 5 includes an octenary counter 5-1 for receiving a clock CLK of 128K to outputting one pulse for every 8th counting of the 128K clock, and a delay 5-2 consisting of an RC circuit for receiving to delay the 128K clock for 200 ns to avoid a glitch pulse of a timer clock S2 output to the burst processor 2. An AND gate 5-3 performs the AND operation of two signals from the octenary counter 5-1 and delay 5-2 to supply the timer clock S2 to the burst processor 2, and an OR gate 5-4 receives a clear signal S1 from the data transmitter 8 and the timer clock S2 from the AND gate 5-3 to output a shift load clock S3. An 8-bit parallel-input/serial-output shift register (8-bit PISO shift REG.) 5-5 receives the 128K clock signal and the shift load clock S3 from the OR gate 5-4 to produce a burst transmission carrier and a clock preamble pattern. When receiving a signal for commanding the output of the preamble data in data from the burst processor 2 via an 8-bit burst processor data bus B1, an EPROM 5-7 receives the command signal via a latch 5-6 to supply the stored preamble data to the 8-bit parallel-input/serial-output shift register 5-5.

The data transmitter 8 is formed of a first OR gate 8-1 for supplying the clear signal S1 which clears the octenary counter 5-1 to permit the user pure data to be transmitted in accordance with the output values of the transmission-ready completion signal CTS from the burst processor 2 and a mute signal MUTE, and a ½ encoder 8-2 for receiving the transmission-ready completion signal CTS simultaneously supplied to the first OR gate 8-1 to ½ encode input user data of 64 Kbps.

Hereinafter, an operation of the apparatus according to the present invention constructed as above will be described in detail.

The FIT detector 1 of the end office receives 66.66 Kbps data successively transmitted from the district center to detect an FIT sync signal S4 being 2.66 Kbps sync signal, an FIT clock signal S5 and FIT data S6, thereby supplying the detected signals to the burst processor 2. Upon the receipt of the signals, the burst processor 2 which has an internal memory and 32 I/O ports decodes the FIT signal whenever it is supplied from the FIT detector 1, and supplies the carrier ID in the decoded data to the first D flip-flop 3-1.

Figure 2:
FIG. 2 is a timing chart illustrating a method for transmitting burst data according to the present invention.

Now, the FIT signal received from the district center is analyzed with reference to the timing chart of FIG. 2. The waveform thereof is designated by FIT_DA in FIG. 2, of which vlaue is as follows when separated into the F signal, I signal and T signal:

FIT_DATA=0 0 1 0 1 1 0 1 1 0 1 1 1 0 1 $T_8$ $I_8$ $F_8$ $T_7$ $I_7$ $F_7$ $T_6$ $I_6$ $F_6$ $T_5$ $I_5$ $F_5$ $T_4$ $I_4$ $F_4$ 0 1 1 0 1 1 0 1 1 0 0 0 $T_3$ I3 $F_3$ $T_2$ $I_2$ $F_2$ $T_1$ $I_1$ $F_1$ $T_0$ $I_0$ $F_0$

When the data formed as above is classified into the F signal, I signal and T signal, F signal=011111111, I signal=011101110 that represents the 77th, in other words, the carrier ID is 77, and T signal=001010000 that represents $2^6+2^4=80$, in other words, the assigned time slot number is 80.

The first D flip-flop 3-1 which receives the carrier ID of the number as stated above supplies it to the control processor 3-2 which compares the received carrier ID with its own preset carrier ID by means of the carrier ID switch 4 of the end office. Thus, when they are the same to each other, the time slot number assigned from the district center among the time slots totally numbering 100 is provided to the burst processor 2 via the second D flip-flop 3-4.

After this, the burst processor 2 stores the input time slot number in the memory therein, and supplies the signal to the preamble pattern generator 5 for outputting the preamble data when the transmission request signal RTS is received from the DIE 7. This processor will be described as below.

Once the user data is input from the user computer 6 to the DIE 7, it is processed in 64 Kbps data rate to be output to the ½ encoder 8-2 which encodes the data into 128 Kbps data tuned to the input clock of 128K.

When the data is processed to 128 Kbps, the DIE 7 simultaneously outputs the transmission request signal RTS to the burst processor 2. At this time, the value of the transmission request signal is "low." The burst processor 2 recognizing the input of the transmission request signal RTS searches out a current time slot in the internal memory thereof to assign the slot in the succeeding time slot, thereby allowing for the start of the transmission.

When the FIT data S6 of the reasonable time slot is detected, the burst processor 2 outputs the mute signal MUTE supplied to the OR gate 8-1 in "low" value along with the transmission-ready completion signal CTS, and the OR gate 8-1 receives the signals to output the clear signal.

If the mute signal MUTE is received in "low" value, the transmission of the preamble data stored in the EPROM 5-7 begins. At this time, the octenary counter 5-1 provides one pulse per 8th counting of the 128K clock, i.e., to produce the shift load clock S3 output via the OR gate 5-4.

The octenary counter 5-1 is employed for loading the 8-bit parallel-input/serial-output shift register 5-5, and, as mentioned above, supplies one clock pulse to the timer clock S2 of the burst processor 2 from the AND gate 5-3 per 8th clock pulse of the 128K clock during an interval of the carrier and clock preamble while providing one pulse for every 128K clock during the 128 Kbps user data transmission.

At this time, the AND gate 5-3 is supplied with the delay signal having delay of 200 ns with respect to the 128K clock via the delay 5-2 to avoid the glitch pulse in the output of the AND gate 5-3 together with the pulse from the octenary counter 5-1.

When the preparation of transmitting the preamble data is completed through the above-described process, the preamble data stored in the EPROM 5-7 is loaded in parallel by the burst processor 2 to be input in parallel to the 8-bit parallel-input/serial-output shift register 5-5, which is then serially output tuned to the 128K clock received by the 8-bit parallel-input/serial-output shift register 5-5.

The transmitted preamble data is formed such that the total byte number occupied by the preamble data is 32 byte, in which the 27 byte is of the carrier having the value of zero, the remaining 5 byte is formed of '55 Hex.', and the 128 Kbps user data signal value is set to 'low' during transmitting the preamble data.

Hereinbelow, a process of transmitting the 128 Kbps user data will be described.

During the transmission of the preamble data, the transmission-ready completion signal CTS is 'low' and goes to 'high' from two clocks ahead of the completion of the preamble data transmission. Then, the signal value is input to the OR gate 8-1, and the clear signal S1 therefrom is supplied to the octenary counter 5-1 which is cleared upon the receipt of the clear signal S1 while maintaining 'high'.

By this operation, the timer clock of the burst processor 2 is changed into 128K clock, and, successively, the 128 Kbps user data being held is output as the burst data via the OR gate 9.

This operation is illustrated as the timing chart of FIG. 2, in which the RTS denotes the transmission request signal, MUTE is a signal for blocking the intermediate frequency state in case of no transmission data, CTS is the transmission-ready completion signal, PRE_AM is the preamble data, 128 KDA is the 128 Kbps data, FIT_SY is the FIT sync signal, FIT_DA is the FIT signal, and FIT_CL is the FIT clock.

Upon the completion of the data transmission through the above-described process, the burst processor 2 forces a reset signal RESET to 'low' for holding the output of the 8-bit parallel-input/serial-output shift register 5-5 to 'low'. Thereafter, when the data transmission is finished in the user computer 6, the transmission request signal RTS goes to 'high'. By this operation, the burst processor 2 changes to output the mute signal MUTE to 'high' after counting of 38 times and the transmission-ready completion signal CTS to 'low'.

Then, the octenary counter 5-1 is initialized for the next burst preamble. Therefore, the transmission of the burst data is thoroughly completed.

As described above, a sync signal is required when data is transmitted from all end offices to a district center. In the present invention, when a signal is transmitted together with data from the district center, the sync signal is simply extracted from the signal to be utilized for transmitting the data. As a result, a separate sync channel is not required to thereby obtain an economical effect.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for transmitting burst data from an end office to a district center using a sync signal of said district center, the apparatus comprising:

a frame/identification/timing (FIT) detector for receiving to analyze an FIT signal transmitted from said district center;

a burst processor for receiving to decode the data analyzed by said FIT detector, and storing a time slot number;

a controlling portion for controlling overall system of said end office in accordance with an input of a carrier ID signal decoded by said burst processor and outputting said time slot number to said burst processor;

a carrier ID switch used for setting a carrier ID of said end office to both said district center and end office during the system construction of said district center and end office;

a preamble pattern generating portion for generating a preamble pattern for allowing for the data transmission upon the receipt of the time slot number to be transmitted;

a user computer for supplying pure data to be transmitted to said district center, and simultaneously outputting a transmission request signal;

a data interface equipment for interfacing said user computer and end office;

a data transmitting portion for encoding said pure data output via said data interface equipment, and outputting the encoded data in accordance with the input of a transmission-ready completion signal from said burst processor; and an OR gate for outputting said preamble data and user pure data from said data transmitting portion and preamble pattern generating portion.

2. The apparatus of claim 1, wherein said controlling portion comprises:

a first D flip-flop for storing said carrier ID from said burst processor;

a control processor for comparing said carrier ID signal from said first D flip-flop with the ID of said end office stored in said carrier ID switch, and regarding the result as its own ID when they are the same to output the time slot number assigned by said district center among a plurality of time slots;

a buffer for temporarily storing said carrier ID from said control processor; and a second D flip-flop for receiving said time slot number from said control processor to output said received time slot number to said burst processor.

3. The apparatus of claim 1, wherein said preamble pattern generating portion comprises:

an octenary counter for receiving 128K clock to output one pulse per every 8th counting of said 128K clock;

a delay formed of an RC circuit for receiving said 128K clock, and delaying said 128K clock for 200 ns to avoid a glitch pulse of a timer clock supplied to said burst processor;

an AND gate for performing the AND operation of two signals from said octenary counter and delay, and outputting a timer clock signal to said burst processor;

an OR gate for performing the OR operation of a clear signal from said data transmitting portion and said timer clock signal from said AND gate to output a shift load clock signal;

an 8-bit parallel-input/serial-output shift register for receiving said 128K clock signal and said shift load clock signal from said OR gate to generate a burst transmission carrier and clock preamble pattern; and an EPROM for receiving a signal that commands the output of said preamble data in data from said burst processor via an 8-bit burst processor data bus through a latch, and outputting said preamble data stored in said EPROM to said 8-bit parallel-input/serial-output shift register.

4. The apparatus of claim 1, wherein said data transmitting portion comprises:

a first OR gate for outputting a clear signal to clear an octenary counter for transmitting said user pure data in accordance with said transmission-ready completion signal from said burst processor and mute signal; and a ½ encoder for simultaneously receiving said transmission-ready completion signal supplied to said first OR gate, and encoding said user data of 64 Kbps.

5. A method for transmitting burst data from an end office to a district center using a sync signal of said district center, the method comprising the steps of receiving to extract a frame/identification/timing (FIT) signal being a sync signal transmitted along with data from said district center to said end office, analyzing said FIT signal to obtain a carrier ID and a time slot number, and transmitting burst data to the assigned time slot, whereby said burst data is transmitted by means of said FIT signal without using a separate sync channel.

6. The method of claim 5, wherein said FIT signal is formed of one slot of 27 bits in total by an F signal of 9 bits as said sync signal during the data transmission, an I signal of 9 bits representing said carrier ID of said end office, and a T signal of 9 bits representing said time slot number assigned from said district center.

7. The method of claim 6, wherein said carrier ID being said I signal is a signal representing an inherent number of said end office, and is set in advance by means of a dual in-line package (DIP) switch between said district center and end office.

8. The method of claim 5, wherein said burst data is formed of preamble data for receiving the burst data transmitted from a modulator of said district center to said end office to allow a clock and carrier to be restored, and user pure data.

9. The method of claim 8, wherein said burst data is of 32 bytes in total by the carrier signal being 27 byte of zero, and 5 bytes provided to the value of 55 Hex used for synchronization in said district center which receives said burst data.

10. The method of claim 8, wherein the step of transmitting said burst data comprises:

a step of outputting a transmission request signal by a data interface equipment to a burst processor while said pure data received from a user computer is processed in 128 Kbps via a ½ encoder;

a step of searching a current time slot in an internal memory by said burst processor upon the recognition of the input of said transmission request signal, and assigning a slot in the following time slot to allow for the start of the transmission;

a step of simultaneously outputting a mute signal in low value when FIT signal of a proper time slot and a transmission-ready completion signal to transmit said preamble data stored in an EPROM.

11. The method of claim 10, wherein the step of transmitting said burst data comprises:

a step of changing said transmission-ready completion signal maintained in low value during transmitting said preamble data to high value from two clocks ahead of completing the transmission of said preamble data;

a step of supplying said transmission-ready completion signal to an OR gate to input a clear signal to an octenary counter; and a step of clearing said octenary counter upon the receipt of said clear signal while maintaining high value, and simultaneously changing a timer clock of said burst processor into 128K clock to output said 128 Kbps user data as said burst data via said OR gate.

12. The method of claim 11, wherein, after completing the transmission of said 128 Kbps user data transmission, said burst processor forces a reset signal to be low for holding the output of an 8-bit parallel-input/serial-output shift register, and said user computer converts said transmission request signal to high, and said burst processor then changes to output said mute signal to high after counting of 38 times and said transmission-ready completion signal to low, and initializing said octenary counter for the next burst preamble.

* * * * *